United States Patent
Yeh et al.

(10) Patent No.: US 8,565,619 B2
(45) Date of Patent: Oct. 22, 2013

(54) PREVENTION OF COLLISION FOR TIME DIVISION MULTIPLEXING OPTICAL NETWORK, APPARATUS AND METHOD THEREOF

(75) Inventors: Chien-Hung Yeh, Hsinchu County (TW); Sien Chi, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1091 days.

(21) Appl. No.: 11/964,019

(22) Filed: Dec. 25, 2007

(65) Prior Publication Data

US 2009/0110397 A1 Apr. 30, 2009

(30) Foreign Application Priority Data

Oct. 31, 2007 (TW) .............................. 96141055 A

(51) Int. Cl.
*H04B 10/00* (2013.01)
*H04J 14/00* (2006.01)

(52) U.S. Cl.
USPC ................. 398/197; 398/8; 398/66; 398/194; 398/201

(58) Field of Classification Search
USPC ................. 398/8, 194, 197, 201, 66
See application file for complete search history.

(56) References Cited

U.S. PATENT DOCUMENTS

| 2004/0208558 A1* | 10/2004 | Roorda et al. | 398/57 |
| 2005/0244160 A1 | 11/2005 | Seo | |
| 2005/0281557 A1* | 12/2005 | Fishman et al. | 398/49 |
| 2006/0039702 A1* | 2/2006 | Su et al. | 398/79 |
| 2006/0198635 A1* | 9/2006 | Emery et al. | 398/38 |

FOREIGN PATENT DOCUMENTS

| CN | 101018090 | 8/2007 |
| JP | 09-046298 | 2/1997 |
| JP | 10-303817 | 11/1998 |
| JP | 2005-286803 | 10/2005 |

* cited by examiner

*Primary Examiner* — Nathan Curs
(74) *Attorney, Agent, or Firm* — Jianq Chyun IP Office

(57) ABSTRACT

An apparatus for preventing collision of upstream signals is provided. The apparatus is suitable for a time division multiplexing (TDM) passive optical network (PON). The apparatus includes an optical coupler device, an optic-electron converter (O/E), a control system, and an optical signal switch module. The O/E is coupled to the optical coupler device, the control system is coupled to the O/E, and the optical signal switch module is coupled to the optical coupler device and the control system. The optical coupler device receives a first optical signal and splits the first optical signal into a second optical signal and a third optical signal. The O/E converts the second optical signal into a first electrical signal. The control system generates a control signal according to the first electrical signal. The optical signal switch module determines whether to stop the third optical signal from passing the apparatus according to the control signal.

15 Claims, 8 Drawing Sheets

PREVENTION OF COLLISION FOR TIME DIVISION MULTIPLEXING OPTICAL NETWORK, APPARATUS AND METHOD THEREOF

CROSS-REFERENCE TO RELATED APPLICATION

This application claims the priority benefit of Taiwan application serial no. 96141055, filed on Oct. 31, 2007. The entirety of the above-mentioned patent application is hereby incorporated by reference herein and made a part of this specification.

BACKGROUND OF THE INVENTION

1. Field of the Invention

The present invention generally relates to a time division multiplexing (TDM) passive optical network (PON) system for preventing signal collision, an apparatus thereof, and a method thereof.

2. Description of Related Art

The quantity of data transmitted over networks increases along with the increase of network users. In the conventional communication technique wherein data is transmitted as electric signals, network congestion may be caused due to the bandwidth limitation of the electric signals. Thus, optical fiber communication is adopted by many network service providers for providing various network services to network users.

Optical fiber communication offers greater bandwidth than wireless or cable communication using electric signals therefore can transmit data of larger quantity and provide better network services. Presently, passive optical network (PON) is usually adopted by optical fiber communication systems. A PON is easy to maintain and consumes less power because it uses passive devices and requires less switching equipment. Nowadays, many countries are dedicated to the development of PONs such as fiber to the home (FFTH), fiber to the curb (FFTC), and fiber to the building (FFTB) by using optical fiber communication techniques in order to allow network users to transmit and receive data in high speed and large quantity. Accordingly, PON is playing as one of today's major communication techniques.

In a PON, each optical network unit (ONU) has different distance to an optical line termination (OLT) in the central office. Accordingly, the transmission of upstream signals (usually optical signals of 1310 nm) can be controlled in a time division multiplexing (TDM) manner in order to prevent signal collision. As a result, the optical transceiver in each ONU has to be a laser source in burst mode in order to meet the requirement of the TDM transmission manner. The entire PON will collapse if any ONU in the PON turns from the burst mode into a continuous wave (CW) mode due to some module problems. It is impossible to transmit all the upstream signals due to the problem of signal collision.

FIG. 1A is a schematic diagram of a conventional TDM PON 100 in normal operation. Referring to FIG. 1A, the TDM PON 100 includes an OLT 101, a plurality of optical fibers 102, an optical coupler device 103, and a plurality of ONUs 1041~1044. The OLT 101 is coupled to the optical coupler device 103 via the optical fiber 102, and the optical coupler device 103 is coupled to the ONUs 1041~1044 via the optical fibers 102. Regarding a downstream signal, the optical coupler device 103 splits the downstream signal so that each ONU can receive a downstream signal; and regarding upstream signals, the optical coupler device 103 couples an upstream signal of each ONU so that the upstream signals of the ONUs 1041~1044 can be transmitted to the OLT 101 successfully.

The ONUs 1041~1044 are respectively assigned time slots ts_1~ts_4. If the ONU 1041 has upstream data, the ONU 1041 has to transmit the upstream data to the OLT 101 in time slot ts_1. Similarly, the other ONUs 1042~1044 respectively transmit their upstream data to the OLT 101 in their own time slots ts_2~ts_4. Accordingly, the laser sources in the ONUs 1041~1044 have to operate in burst mode.

FIG. 1B is a schematic diagram of the conventional TDM PON 100 operating in the condition of signal collision. When the laser source in the ONU 1043 turns from burst mode into CW mode due to some external or other factors such as earthquake, damaged optical fibber module, or other environmental problems, the upstream signals of the ONUs 1041, 1042, and 1044 may collide with the upstream signal of the ONU 1043 so that the TDM transmission manner is destroyed and accordingly the entire TDM PON 100 collapses.

In order to prevent foregoing situation, a method and an apparatus for transmitting a control signal through an OLT for controlling the on or off of each ONU are disclosed in U.S. Patent No. 2005/0244160 A1. However, the OLT circuit has to be re-designed in this disclosure.

SUMMARY OF THE INVENTION

Accordingly, the present invention is directed to an apparatus for preventing collision of upstream signals. The apparatus is suitable for a time division multiplexing (TDM) passive optical network (PON). The apparatus has simple structure and low manufacturing cost and can be used for preventing collapse of the TDM PON caused by signal collision.

The present invention is directed to a method for preventing collision of upstream signals. The method is suitable for a TDM PON, and an apparatus executing this method can be used for preventing collapse of the TDM PON caused by signal collision.

The present invention is also directed to a TDM PON system for preventing collision of upstream signals. This TDM PON system is achieved by slightly revising the structure of a conventional TDM PON, and unlike the conventional TDM PON, this TDM PON system will not collapse due to signal collision.

The present invention provides an apparatus for preventing collision of upstream signals. The apparatus is suitable for a TDM PON. The apparatus includes an optical coupler device, an optic-electron converter (O/E), a control system, and an optical signal switch module. The O/E is coupled to the optical coupler device, the control system is coupled to the O/E, and the optical signal switch module is coupled to the optical coupler device and the control system. The optical coupler device receives a first optical signal and splits the first optical signal into a second optical signal and a third optical signal. The O/E converts the second optical signal into a first electrical signal, and the control system generates a control signal according to the first electrical signal. The optical signal switch module determines whether to stop the third optical signal from passing the apparatus according to the control signal.

The present invention provides a method for preventing collision of upstream signals. The method is suitable for a TDM PON. First, a first optical signal is split into a second optical signal and a third optical signal. Next, the second optical signal is converted into a first electrical signal. After that, a control signal is generated according to the first electrical signal. Finally, whether the third optical signal is output is determined according to the control signal.

The present invention provides a TDM PON system for preventing collision of upstream signals. The TDM PON system includes an optical line termination (OLT), a first optical coupler device, a plurality of end-user devices, and a plurality of optical fibers. The optical fibers connect the OLT and the first optical coupler device and also connect the first optical coupler device and the end-user devices. Each of the end-user devices includes an optical network unit (ONU) and a signal collision prevention apparatus. The signal collision prevention apparatus is coupled to the ONU and receives a first optical signal from the ONU. The signal collision prevention apparatus splits the first optical signal into a second optical signal and a third optical signal and determines whether to output the third optical signal according to the second optical signal.

In the present invention, an apparatus for preventing collision of upstream signals is used for controlling an ONU so that a TDM PON will not collapse due to collision of upstream signals. In addition, the apparatus for preventing collision of upstream signals has simple structure, low manufacturing cost, and low hardware complexity and is easily integrated with the ONU.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
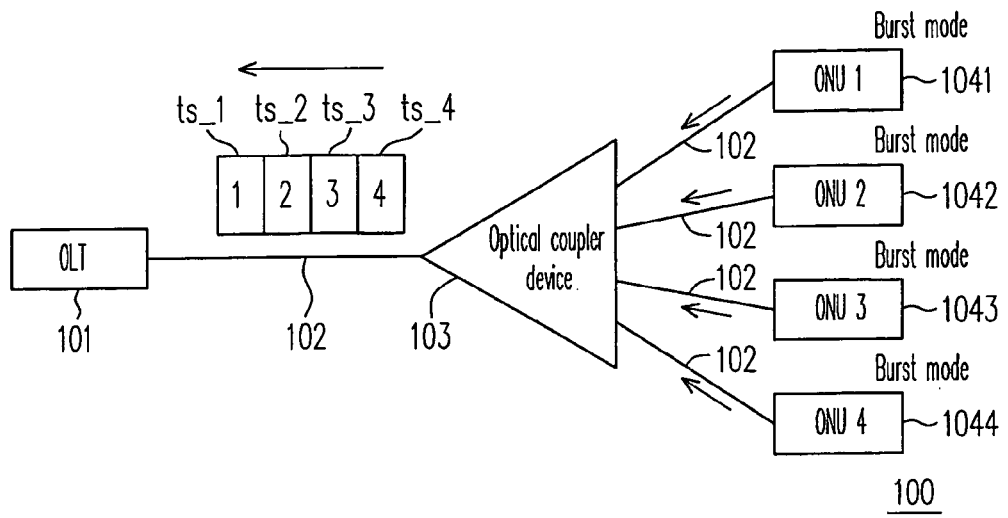
FIG. 1A is a schematic diagram of a conventional time division (multiplexing (TDM) passive optical network (PON) 100 in normal operation.
Figure 1B:
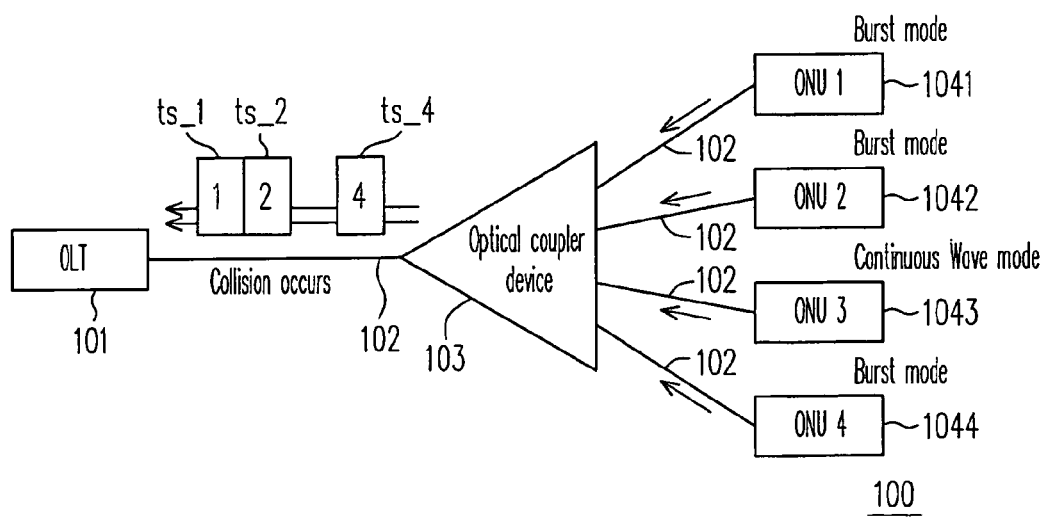
FIG. 1B is a schematic diagram of the conventional TDM PON 100 operating in the condition of signal collision.

Reference will now be made in detail to the present preferred embodiments of the invention, examples of which are illustrated in the accompanying drawings. Wherever possible, the same reference numbers are used in the drawings and the description to refer to the same or like parts.

According to embodiments of the present invention, a time division multiplexing (TDM) passive optical network (PON) system for preventing collision of upstream signals, an apparatus thereof, and a method thereof are provided.

Figure 2A:
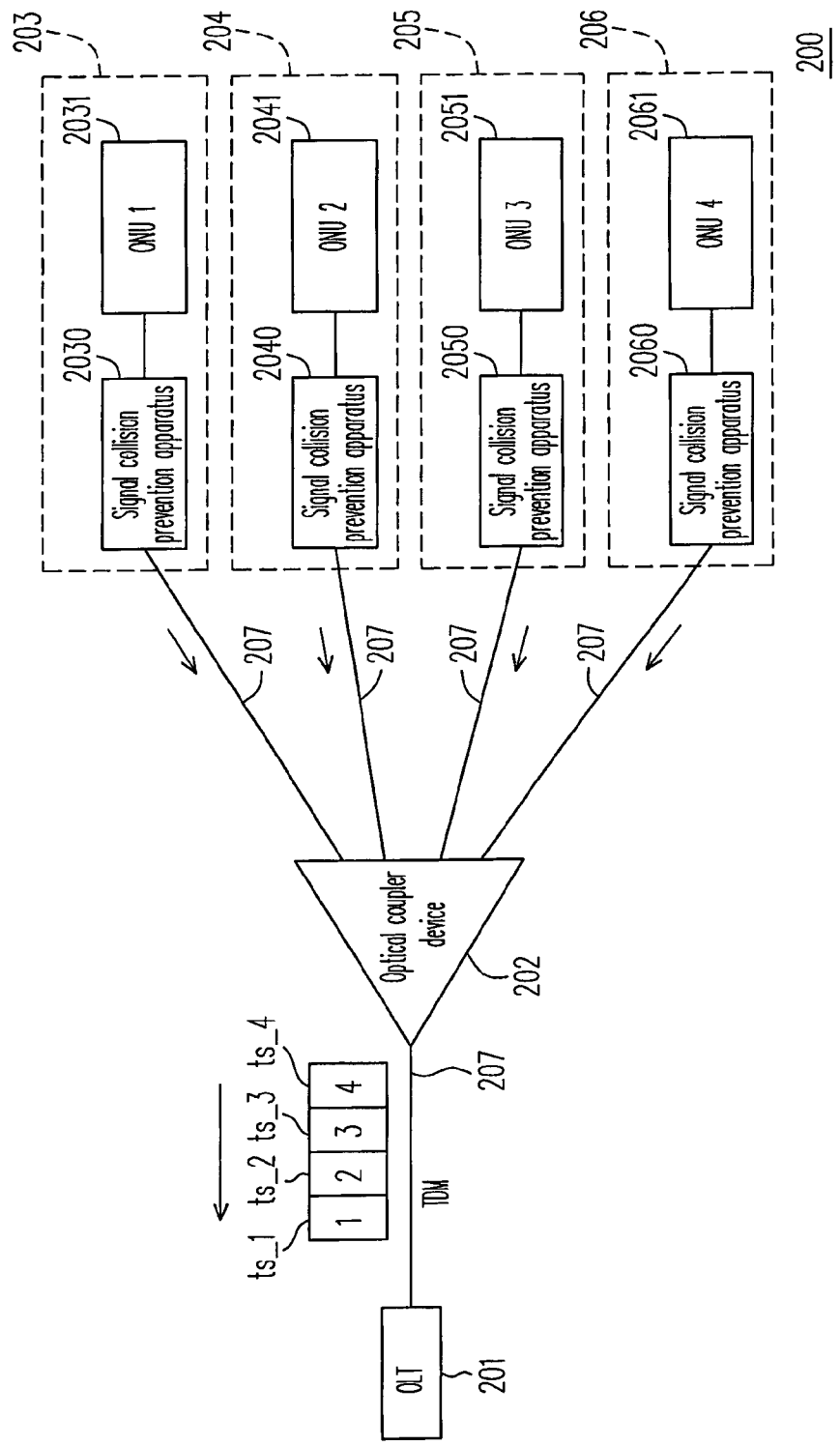
FIG. 2A is a schematic diagram of a TDM PON system 200 for preventing collision of upstream signals according to an embodiment of the present invention.

FIG. 2A is a schematic diagram of a TDM PON system 200 for preventing collision of upstream signals according to an embodiment of the present invention. Referring to FIG. 2A, the TDM PON system 200 includes an optical line termination (OLT) 201, an optical coupler device 202, a plurality of end-user devices 203~206, and a plurality of optical fibers 207. The optical fibers 207 connect the OLT 201 and the optical coupler device 202 and also connect the optical coupler device 202 and the end-user devices 203~206. The optical coupler device 202 may be an optical coupler (OCP) or an optical splitter (OS). In short, the optical coupler device can be any device which can split or couple optical signals, and foregoing embodiment of the optical coupler device as an OCP or an optical splitter is not intended for limiting the scope of the present invention.

Regarding a downstream signal, the optical coupler device 202 splits the downstream signal so that each of the end-user devices 203~206 can receive a downstream signal, and regarding upstream signals, the optical coupler device 202 couples an upstream signal of each of the end-user devices 203~206 so that the upstream signal of each of the end-user devices 203~206 can be successfully transmitted to the OLT 201. In the TDM PON system 200, the end-user devices 203~206 are respectively assigned corresponding time slots ts_1~ts_4, and the end-user devices 203~206 can respectively transmit data in their own time slots ts_1~ts_4.

The end-user device 203 includes an optical network unit (ONU) 2031 and a signal collision prevention apparatus 2030. The signal collision prevention apparatus 2030 is coupled to the ONU 2031 and receives an optical signal from the ONU 2031. The signal collision prevention apparatus 2030 splits the optical signal received from the ONU 2031 into a detection optical signal and a data optical signal and determines whether to output the data optical signal according to the detection optical signal. The structures of the end-user devices 204~206 are similar to that of the end-user device 203 therefore will not be described herein.

If an error occurs to the ONU 2051 in the end-user device 205 and accordingly the transceiver in the ONU 2051 turns into a continuous wave (CW) mode, the TDM PON 200 will not collapse. This is because when the error occurs to the ONU 2051, a signal collision prevention apparatus 2050 stops the ONU 2051 from constantly transmitting optical signals so that the ONUs 2031, 2041, and 2061 can transmit data in the corresponding time slots ts_1, ts_2, and ts_4.

Figure 2B:
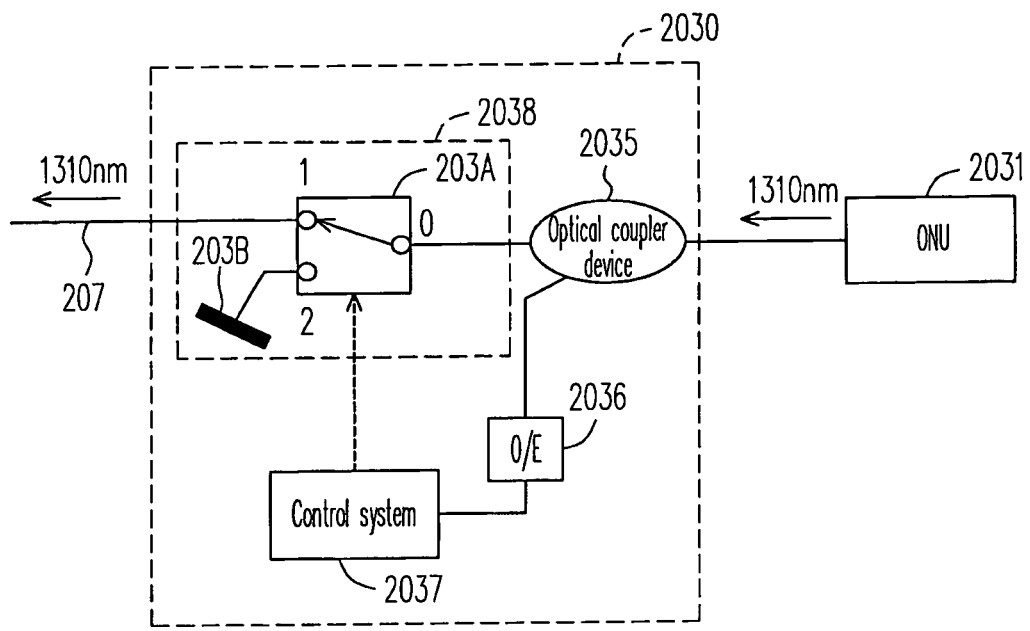
FIG. 2B is a schematic diagram of a signal collision prevention apparatus 2030 in FIG. 2A.

FIG. 2B is a schematic diagram of the signal collision prevention apparatus 2030. Herein only the signal collision prevention apparatus 2030 is described; however, the structures of the other signal collision prevention apparatuses 2040~2060 are the same as that of the signal collision prevention apparatus 2030. Referring to FIG. 2B, the signal collision prevention apparatus 2030 includes an optical coupler device 2035, an optic-electron converter (O/E) 2036, a control system 2037, and an optical signal switch module 2038. The O/E 2036 is coupled to the optical coupler device 2035, the control system 2037 is coupled to the O/E 2036, and the optical signal switch module 2038 is coupled to the optical coupler device 2035 and the control system 2037.

The optical coupler device 2035 receives an optical signal from the ONU 2031 and splits the optical signal into a detection optical signal and a data optical signal. The O/E 2036 converts the detection optical signal into a detection electrical signal, and the control system 2037 generates a control signal according to the detection electrical signal. The optical signal switch module 2038 determines whether to stop the data optical signal from passing the signal collision prevention apparatus 2030 according to the control signal.

As shown in FIG. 2B, the optical signal switch module 2038 includes an optical switch (OS) 203A and a photoresist device 203B. The optical switch 203A has an input terminal 0, a first output terminal 1, and a second output terminal 2, wherein the input terminal 0 is coupled to the optical coupler device 2035, the second output terminal 2 is coupled to the photoresist device 203B, and the first output terminal 1 is coupled to the optical fiber 207. The optical switch 203A outputs the data optical signal from the first output terminal 1 or the second output terminal 2 according to the control signal, and the photoresist device 203B stops the data optical signal. Additionally, in the present embodiment, the data optical signal is an upstream signal of 1310 nm; however, the wavelength of the data optical signal is not limited in the present invention.

Normally, the ONU 2031 in FIG. 2B operates in a burst mode and the data optical signal is successfully output to the optical fiber 207. Thus, the optical switch 203A transmits the data optical signal from the input terminal 0 to the first output terminal 1. Additionally, the optical coupler device 2035 may be an optical coupler (OCP) or an optical splitter embodied with a planar lightwave circuit (PLC) or a waveguide duct. The O/E 2036 can be embodied with a photodiode. The photodiode may be a positive-intrinsic-negative (PIN) photodiode, an avalanche photodiode (APD), or a metal-semiconductor-metal (MSM) photodiode.

Foregoing embodiments of the O/E 2036, the optical coupler device 2035, and the optical signal switch module 2038 are not intended for limiting the scope of the present invention; instead, the O/E 2036, the optical coupler device 2035, and the optical signal switch module 2038 can also be embodied differently to achieve the same functions as described above. In short, FIG. 2B illustrates only an embodiment of the present invention but not for limiting the present invention, and various changes in form and details may be made therein without departing from the spirit and scope of the present invention.

Figure 2C:
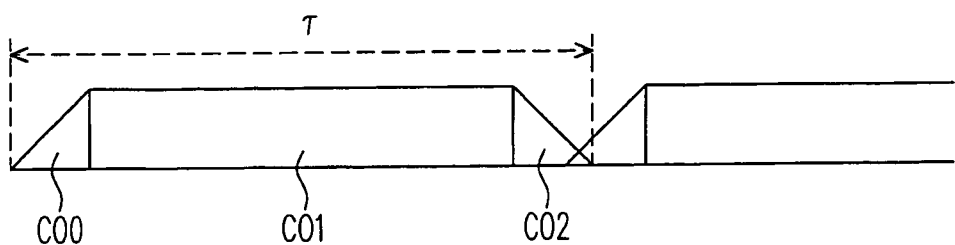
FIG. 2C is a diagram of an optical signal when an optical network unit (ONU) 2031 in FIG. 2A operates in a burst mode.

FIG. 2C is a diagram of an optical signal when the ONU 2031 operates in a burst mode. When the ONU 2031 operates in the burst mode, the time τ for the optical signal to occupy the channel is the total of a turn-on time C00, a turn-off time C02, and a data transmission time C01 of the laser source in the ONU 2031. With existing PON standard, the time τ is usually no more than several microseconds, and herein the optical switch 203A transmits the data optical signal to the optical fiber 207 via the first output terminal 1 so as to allow the TDM PON 200 to connect correctly.

Figure 2D:
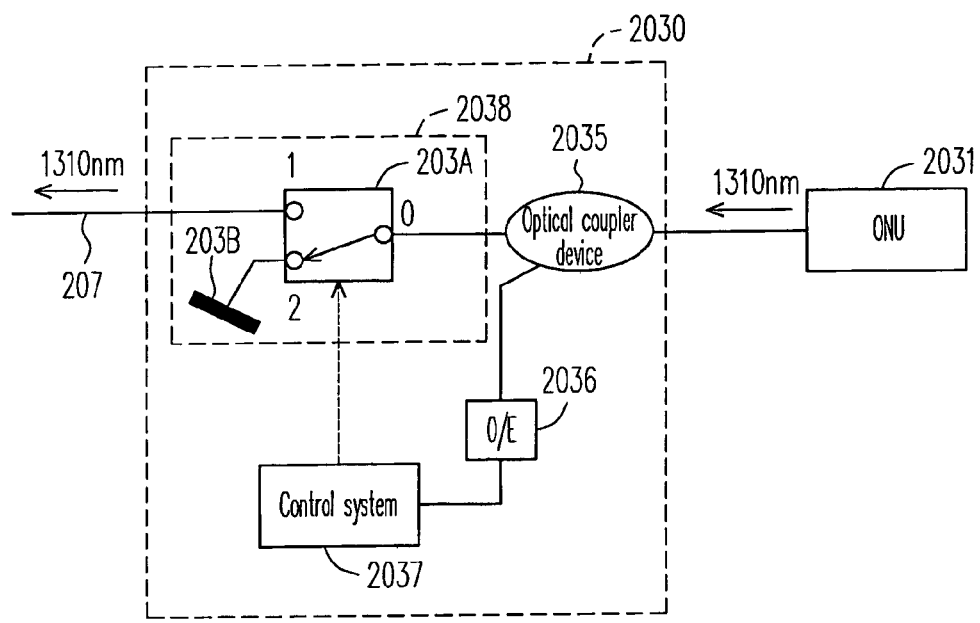
FIG. 2D is a diagram illustrating the operation of an optical switch 203A when the ONU 2031 in FIG. 2A operates in a continuous wave (CW) mode.
Figure 2E:
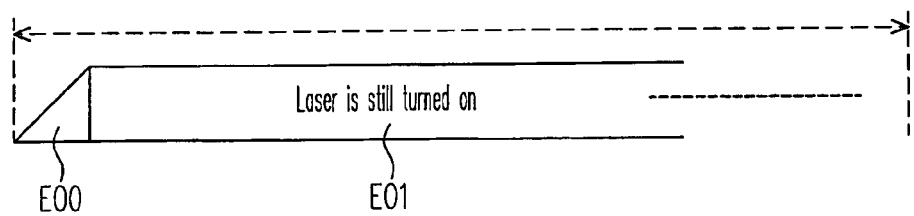
FIG. 2E is a diagram of an optical signal when the ONU 2031 in FIG. 2A operates in the CW mode.

FIG. 2D is a diagram illustrating the operation of the optical switch 203A when the ONU 2031 operates in a continuous wave (CW) mode. FIG. 2E is a diagram of an optical signal when the ONU 2031 operates in the CW mode. When the ONU 2031 operates in the CW mode, the laser source thereof will not be turned off once it is turned on. Thus, the time τ' of the optical signal to occupy the channel is the total of a turn-on time E00 and a turned-on time E01 of the laser source. Here the time τ' is much longer than several microseconds. The signal collision prevention apparatus 2030 stops the data optical signal from passing so that the TDM PON 200 will not collapse. Accordingly, the optical switch 203A transmits the data optical signal to the second output terminal 2 thereof so that the photoresist device 203B can block the data optical signal. The principle of preventing the TDM PON 200 from collapsing is that the control system 2037 determines whether the time of the received detection electrical signal being greater than a threshold value is longer than a predetermined time. When the ONU 2031 is in the CW mode, the laser source emits upstream signals constantly so that the time of the detection electrical signal being greater than the threshold value is longer than the predetermined time. Accordingly, the optical signal switch module 2038 prevents the data optical signal from being output to the optical fiber 207 according to the control signal, wherein the predetermined time is longer than the time τ. When the ONU 2031 is in the burst mode, the laser source emits upstream signals only within the time τ. Thus, the time of the detection electrical signal being greater than the threshold value is shorter than the predetermined time, and accordingly the optical signal switch module 2038 allows the data optical signal to be output to the optical fiber 207.

Figure 3A:
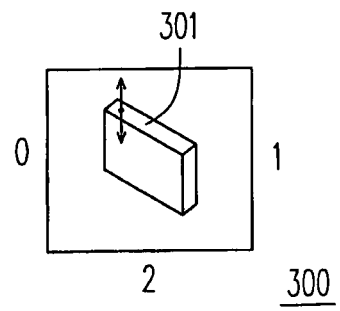
FIG. 3A is a schematic diagram of the optical switch 203A according to an embodiment of the present invention.
Figure 3B:
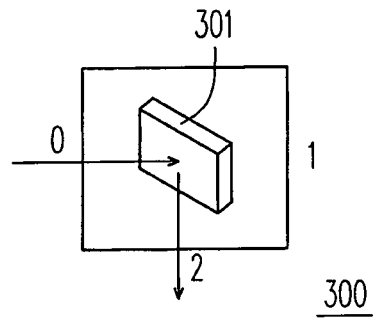
FIG. 3B is a diagram illustrating an optical signal output to the second output terminal 2 of the optical switch 203A.
Figure 3C:
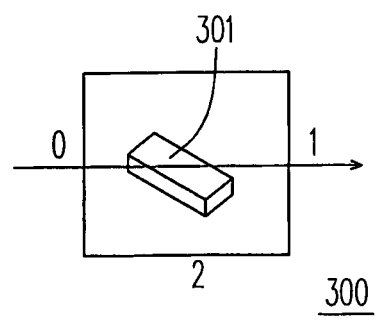
FIG. 3C is a diagram illustrating an optical signal output to the first output terminal 1 of the optical switch 203A.

The optical switch 203A may be a micro-electro-mechanical system (MEMS) latch type optical switch or a semiconductor optical amplifier (SOA) switch. FIG. 3A is a schematic diagram of the optical switch 203A according to an embodiment of the present invention. FIG. 3B is a diagram illustrating an optical signal output to the second output terminal 2 of the optical switch 203A. FIG. 3C is a diagram illustrating an optical signal output to the first output terminal 1 of the optical switch 203A. The optical switch 203A in FIGS. 3A~3B is embodied as a MEMS latch type optical switch 300. Referring to FIG. 3A, the optical switch 300 includes a reflector 301 which can moved up and down, wherein the movement of the reflector 301 is controlled by the control signal. Referring to FIG. 3B, when the control signal controls the reflector 301 to move upwards, the reflector 301 reflects the data optical signal to the second output terminal 2. Referring to FIG. 3C, when the control signal controls the reflector 301 to move downwards, the data optical signal is directly transmitted to the first output terminal 1.

Even though foregoing optical switch 203A is embodied with a MEMS latch type optical switch 300, the present invention is not limited thereto. In other words, the optical switch 203A may also be embodied differently to achieve the function described above without departing from the scope of the present invention.

Figure 4:
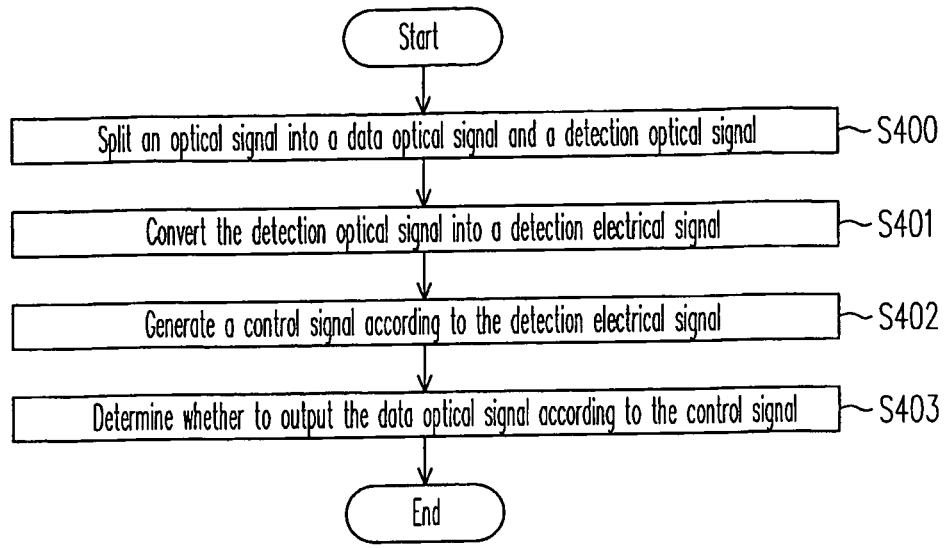
FIG. 4 is a flowchart of a method for preventing collision of upstream signals according to an embodiment of the present invention.

FIG. 4 is a flowchart of a method for preventing collision of upstream signals according to an embodiment of the present invention. The method is suitable for a TDM PON. In this method, first, an optical signal sent by an ONU is split into a data optical signal and a detection optical signal (step S400). Next, the detection optical signal is converted into a detection electrical signal (step S401). After that, a control signal is generated according to the detection electrical signal (step S402). Finally, whether to output the data optical signal is determined according to the control signal (step S403). If the time for the intensity of the detection electrical signal to be higher than a threshold value is longer than a predetermined time, the data optical signal is blocked and not output to the TDM PON, so that collision of upstream signals can be prevented. In addition, the predetermined time and the threshold value can be adjusted according to the actual system requirement.

Figure 5A:
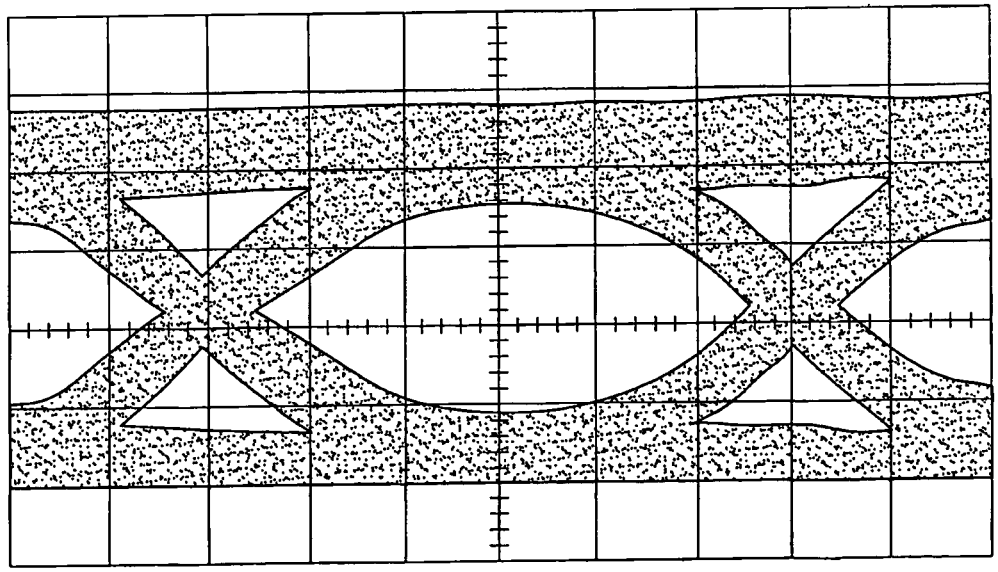
FIG. 5A is an eye diagram of an optical signal when there is no CW mode ONU in a PON according to an embodiment of the present invention.
Figure 5B:
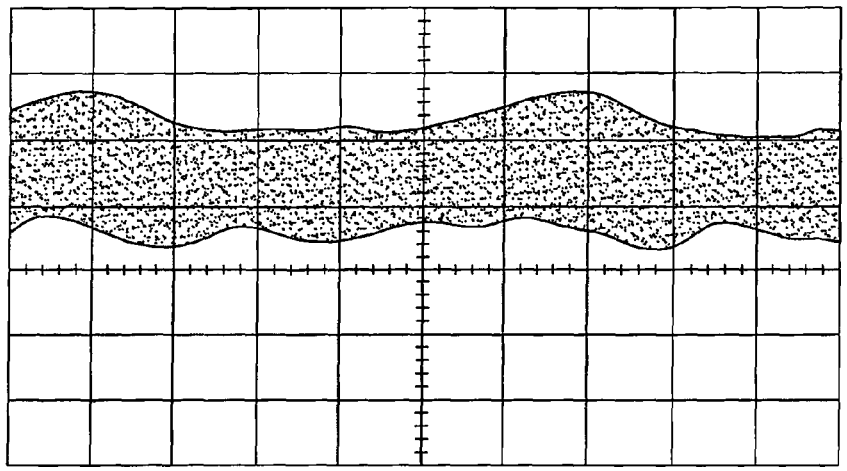
FIG. 5B is an eye diagram of an optical signal when any ONU in a PON is in CW mode and which causes the PON to collapse according to an embodiment of the present invention.
Figure 5C:
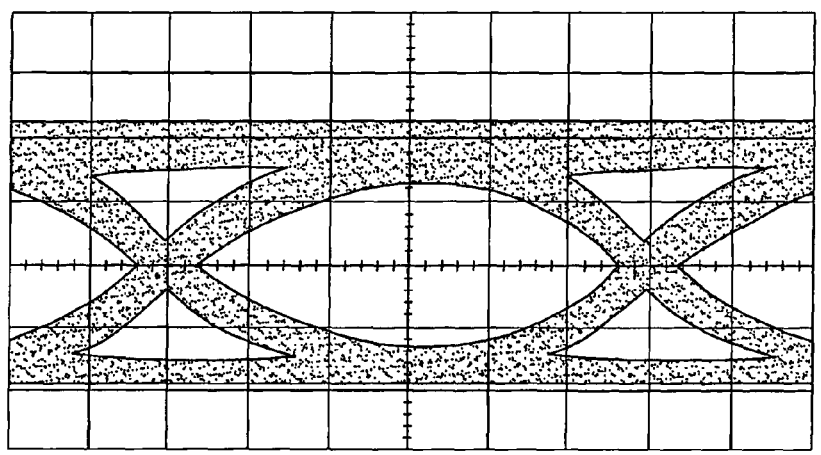
FIG. 5C is an eye diagram of an optical signal when any ONU in a PON is in CW mode and the method and apparatus provided by the present invention are adopted according to an embodiment of the present invention.

FIG. 5A is an eye diagram of an optical signal when there is no CW mode ONU in a PON according to an embodiment of the present invention. FIG. 5B is an eye diagram of an optical signal when any ONU in a PON is in CW mode and which causes the PON to collapse according to the present embodiment of the present invention. FIG. 5C is an eye diagram of an optical signal when any ONU in a PON is in CW mode and the method and apparatus provided by the present invention are adopted according to an embodiment of the present invention. In foregoing PON, the distance from the OLT to an ONU is about 20 km, and all the upstream signals and downstream signals in the PON pass through a 1×8 optical splitter. Laser sources of 1490 nm and 1310 nm are respectively used as the laser sources of downstream signals and upstream signals. In foregoing PON, an optical signal is modulated through 1.25 Gbps direct modulation, and $2^{31}$-1 bits are generated in a non-return-to-zero (NRZ) pseudo random binary sequence (PRBS) mode for measuring the bit error rate (BER) of the entire PON.

As shown in FIG. 5A, when there is no ONU in the CW mode, the eye diagram of the optical signal is very complete and the extinction ratio (ED) thereof is greater than 10 dB. If there is one ONU in CW mode, the upstream signal received by the OLT is seriously distorted due to the problem of signal collision. As shown in FIG. 5B, the eye diagram of the optical signal is very bad because of signal collision, and the ED thereof is nearly undetectable. In FIG. 5B, the received power of the ONU in the CW mode is about −30 dBm, which is very low. The eye diagram of the optical signal will become worse if the received power is under ~30 dBm. If the apparatus and method for preventing collision of upstream signals provided by the present invention are adopted in the PON, the optical signals of an ONU in CW mode are not be transmitted to the PON so that the PON will not collapse. As shown in 5C, since the optical signal of the ONU in CW mode cannot be transmitted to the PON, the eye diagram of the upstream signal received by the OLT is nearly perfect.

Figure 6:
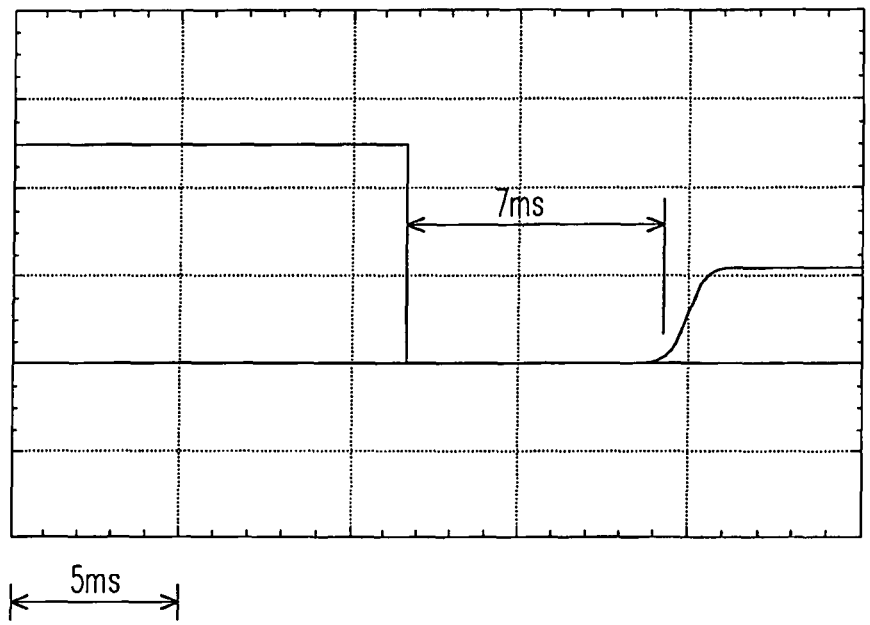
FIG. 6 is a diagram illustrating the on and off time of an optical switch according to an embodiment of the present invention.
Figure 7:
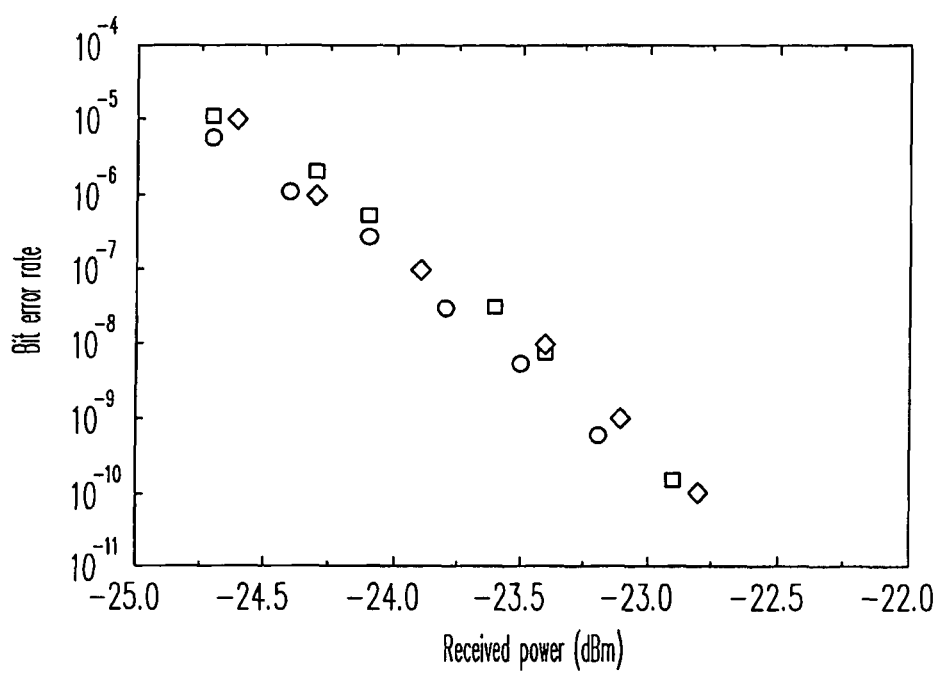
FIG. 7 is a graph of bit error rate (BER) vs. the received power of a downstream signal according to an embodiment of the present invention.

FIG. 6 is a diagram illustrating the on/off time of an optical switch according to an embodiment of the present invention. FIG. 7 is a graph of BER vs. the received power of a downstream signal according to an embodiment of the present invention. As shown in FIG. 6, the response time of the optical switch in the TDM PON system illustrated in FIGS. 5A~5C is about 7 ms. As shown in FIG. 7, the curve denoted with circles represents the BER of back to back transmission; the curve denoted with diamonds represents the BER when there is collision of upstream signals and no collision prevention mechanism is adopted; and the curve denoted with squares represents the BER when there is collision of upstream signals and the apparatus and method for preventing collision of upstream signals provided by the present invention are adopted. As shown in FIG. 7, regardless of whether the collision prevention mechanism is started, the power penalty produced by a downstream signal of 1490 nm is not obviously increased (lower than 0.2 dB) when BER is equal to $10^{-9}$. Accordingly, the apparatus, network system, and method provided by the present invention do not reduce the performance of downstream signals obviously.

In summary, the present invention provides an apparatus, a PON system, and a method for preventing collision of upstream signals such that system collapse caused by collision of upstream signals can be prevented. Moreover, the apparatus provided by the present invention has simple structure, Low manufacturing cost, and low hardware complexity and is easily integrated with an ONU.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for preventing collision of upstream signals, suitable for a time division multiplexing (TDM) passive optical network (PON), the apparatus comprising:

an optical coupler device, for receiving a first optical signal and splitting the first optical signal into a detection optical signal and a data optical signal, wherein the first optical signal is provided by an optical network unit (ONU);

an optic-electron converter (O/E), coupled to the optical coupler device, for converting the detection optical signal into a first electrical signal;

a control system, coupled to the O/E, for generating a control signal according to the first electrical signal; and an optical signal switch module, coupled to the optical coupler device and the control system, for determining whether to guide the data optical signal to a photoresist device of the optical signal switch module away from passing the apparatus for preventing collision of upstream signals according to the control signal, wherein the optical signal switch module guides the data optical signal away from passing the apparatus for preventing collision of upstream signals while the ONU is in an continuous wave (CW) mode if the continuous time of the first electrical signal being greater than a threshold value is longer than a predetermined time; and the optical signal switch module allows the data optical signal to pass the apparatus for preventing collision of upstream signals while the ONU is in an burst mode if the continuous time of the first electrical signal being greater than the threshold value is not longer than the predetermined time.

2. The apparatus according to claim 1, wherein the O/E comprises a photodiode.

3. The apparatus according to claim 2, wherein the photodiode comprises a positive-intrinsic-negative (PIN) photodiode, an avalanche photodiode (APD), or a metal-semiconductor-metal (MSM) photodiode.

4. The apparatus according to claim 1, wherein the optical signal switch module comprises:

an optical switch, having a first output terminal and a second output terminal, for outputting the data optical signal from the first output terminal or the second output terminal according to the control signal; and the photoresist device, coupled to the second output terminal, for stopping the data optical signal from passing the apparatus for preventing collision of upstream signals.

5. The apparatus according to claim 4, wherein the optical switch is a micro-electro-mechanical system (MEMS) latch type optical switch or a semiconductor optical amplifier (SOA) switch.

6. A method for preventing collision of upstream signals, suitable for a TDM PON, the method comprising:

splitting a first optical signal into a detection optical signal and a data optical signal, wherein the first optical signal is provided by an optical network unit (ONU);

converting the detection optical signal into a first electrical signal;

generating a control signal according to the first electrical signal; and determining whether to guide the data optical signal to a photoresist device according to the control signal, wherein the data optical signal is guided to the photoresist device while the ONU is in an continuous wave (CW) mode if the continuous time of the first electrical signal being greater than a threshold value is longer than a predetermined time; and the data optical signal is not guided while the ONU is in an burst mode if the continuous time of the first electrical signal being greater than the threshold value is not longer than the predetermined time.

7. The method according to claim 6, wherein the first optical signal is split into the detection optical signal and the data optical signal by an optical coupler device.

8. The method according to claim 6, wherein the detection optical signal is converted into a first electrical signal by a photodiode.

9. The method according to claim 6, wherein the control signal is generated according to the first electrical signal by a control system.

10. The method according to claim 6, wherein whether to guide the data optical signal to the photoresist device is determined according to the control signal by an optical signal switch module.

11. A TDM PON system for preventing collision of upstream signals, comprising:

an optical line termination (OLT);

a first optical coupler device, for splitting and coupling optical signals;

a plurality of end-user devices, wherein each of the end-user devices comprises:

an ONU; and a signal collision prevention apparatus, coupled to the ONU, for receiving a first optical signal from the ONU and splitting the first optical signal into a detection optical signal and a data optical signal, and for determining whether to guide the data optical signal to a photoresist device according to the detection optical signal; and a plurality of optical fibers, for connecting the OLT and the first optical coupler device and also connecting the first optical coupler device and the end-user devices, wherein each of the signal collision prevention apparatuses comprises:

a second optical coupler device, coupled to the ONU, for receiving the first optical signal and splitting the first optical signal into the detection optical signal and the data optical signal;

an O/E, coupled to the second optical coupler device, for converting the detection optical signal into a first electrical signal;

a control system, coupled to the O/E, for generating a control signal according to the first electrical signal; and an optical signal switch module, coupled to the second optical coupler device and the control system, for determining whether to guided the data optical signal to the photoresist device according to the control signal, wherein the optical signal switch module guided the data optical signal to the photoresist device while the ONU is in an continuous wave (CW) mode if the time of the first electrical signal being greater than a threshold value is longer than a predetermined time, and the optical signal switch module allows the signal collision prevention apparatus to output the data optical signal while the ONU is in an burst mode if the time of the first electrical signal being greater than the threshold value is not longer than the predetermined time.

12. The TDM PON system according to claim 11, wherein the O/E comprises a photodiode.

13. The TDM PON system according to claim 12, wherein the photodiode comprises a PIN photodiode, an APD, or a MSM photodiode.

14. The TDM PON system according to claim 11, wherein the optical signal switch module comprises:

an optical switch, having a first output terminal and a second output terminal, for outputting the data optical signal from the first output terminal or the second output terminal according to the control signal; and the photoresist device, coupled to the second output terminal, for stopping the data optical signal from passing the signal collision prevention apparatus.

15. The TDM PON system according to claim 14, wherein the optical switch is a MEMS latch type optical switch.

* * * * *